(12) United States Patent
Sakai (10) Patent No.: US 11,148,530 B2
(45) Date of Patent: Oct. 19, 2021

(54) MULTI-PURPOSE VEHICLE (71) Applicant: Kubota Corporation, Osaka (JP)

(72) Inventor: Masatoshi Sakai, Sakai (JP)

(73) Assignee: Kubota Corporation, Osaka (JP)

( * ) Notice: Subject to any disclaimer, the term of this patent is extended or adjusted under 35 U.S.C. 154(b) by 837 days.

(21) Appl. No.: 15/835,577

(22) Filed: Dec. 8, 2017

(65) Prior Publication Data

US 2018/0312061 A1    Nov. 1, 2018

(30) Foreign Application Priority Data

May 1, 2017 (JP) .............................. JP2017-091088

(51) Int. Cl.
*B60K 23/08* (2006.01)
*B60K 6/24* (2007.10)
(Continued)

(52) U.S. Cl.
CPC ............ *B60K 23/0808* (2013.01); *B60K 1/00* (2013.01); *B60K 6/24* (2013.01); *B60K 6/26* (2013.01); *B60K 6/28* (2013.01); *B60K 6/48* (2013.01); *B60K 6/52* (2013.01); *B60K 17/352* (2013.01); *B60K 17/354* (2013.01); *B60K 20/02* (2013.01); *B60W 20/40* (2013.01); *B60W 50/082* (2013.01); *B60K 2023/0891* (2013.01);
(Continued)

(58) Field of Classification Search
CPC ... B60K 1/00; B60K 6/20; B60K 6/22; B60K 6/24; B60K 6/26; B60K 6/28; B60K 6/42; B60K 6/48; B60K 6/52; B60K 17/35; B60K 17/352; B60K 17/354; B60K 20/02; B60K 20/08; B60K 23/08; B60K 23/0808; B60K 2023/0883; B60K 2023/0891; B60W 20/40; B60W 50/08; B60W 50/082; B60W 2300/362; F16H 59/02; F16H 59/04; B60Y 2200/92; B60Y 2300/18191; B60Y 2200/182; B60Y 2400/402

See application file for complete search history.

(56) References Cited

U.S. PATENT DOCUMENTS 6,041,877 A * 3/2000 Yamada .................. B60L 50/66
180/65.25
6,295,487 B1   9/2001 Ono et al.
(Continued)

FOREIGN PATENT DOCUMENTS

JP    2004320900 A    11/2004
JP    2007239978 A    9/2007
(Continued)

*Primary Examiner* — Minnah L Seoh
*Assistant Examiner* — Maurice L Williams
(74) *Attorney, Agent, or Firm* — The Webb Law Firm (57) ABSTRACT

A multi-purpose vehicle is disclosed that includes a mode change switch for operating a travel mode of a vehicle body and a mode control device for switching the travel mode of the vehicle body in response to an operation of the mode change switch. The mode control device switches the travel mode of the vehicle body between a two-wheel engine driving mode in which only an engine is driven, a two-wheel motor driving mode in which only a motor is driven, a four-wheel hybrid driving mode in which both of the engine and the motor are driven, and an OFF-mode in which none of the engine and the motor is driven.

11 Claims, 6 Drawing Sheets

(51) Int. Cl.
*B60K 6/26* (2007.10)
*B60K 6/28* (2007.10)
*F16H 48/30* (2012.01)
*B60K 20/02* (2006.01)
*B60W 20/40* (2016.01)
*B60K 1/00* (2006.01)
*B60K 6/52* (2007.10)
*B60W 50/08* (2020.01)
*B60K 6/48* (2007.10)
*B60K 17/354* (2006.01)
*F16H 59/04* (2006.01)

(52) U.S. Cl.
CPC .... *B60W 2300/362* (2013.01); *B60Y 2200/92* (2013.01); *B60Y 2300/182* (2013.01); *B60Y 2300/18191* (2013.01); *B60Y 2400/402* (2013.01); *F16H 59/04* (2013.01); *Y10S 903/916* (2013.01)

(56) References Cited

U.S. PATENT DOCUMENTS

| | | | |
|---|---|---|---|
| 8,998,771 B2 * | 4/2015 | Pietron | B60W 10/06 477/5 |
| 2007/0219047 A1 | 9/2007 | Nakatani et al. | |
| 2007/0267233 A1 * | 11/2007 | Wenthen | B60W 10/08 180/243 |
| 2008/0223634 A1 * | 9/2008 | Yamamoto | B60L 15/20 180/65.285 |
| 2009/0076696 A1 * | 3/2009 | Perkins | B60K 23/08 701/69 |
| 2012/0035792 A1 * | 2/2012 | Dolpp | B60W 50/082 701/22 |
| 2012/0158233 A1 * | 6/2012 | Makino | B60K 6/52 701/22 |
| 2013/0036862 A1 * | 2/2013 | Keller | B60K 6/442 74/661 |
| 2014/0365054 A1 * | 12/2014 | Yamamoto | F02D 11/105 701/22 |
| 2015/0032321 A1 * | 1/2015 | Wimmer | G05G 1/08 701/23 |
| 2016/0167719 A1 * | 6/2016 | Higashiguchi | A01B 63/10 180/336 |
| 2016/0243940 A1 * | 8/2016 | Kawasaki | B60K 35/00 |
| 2016/0325734 A1 * | 11/2016 | Pehrson | B60W 50/082 |
| 2017/0158044 A1 * | 6/2017 | Sakai | B60K 6/52 |
| 2018/0237030 A1 * | 8/2018 | Jones | G05D 1/0055 |

FOREIGN PATENT DOCUMENTS

| | | |
|---|---|---|
| JP | 2009184636 A | 8/2009 |
| JP | 2010143579 A | 7/2010 |
| JP | 201412522 A | 1/2014 |
| JP | 201469603 A | 4/2014 |
| JP | 2015168300 A | 9/2015 |

* cited by examiner

| | OFF-mode M1 | Two-Wheel Motor Driving Mode M2 | Two-Wheel Engine Driving Mode M3 | Four-Wheel Hybrid Driving Mode M4 |
|---|---|---|---|---|
| Key Switch 83 | Off-Position P1 | On-Position P2 | On-Position P2 | On-Position P2 |
| Power Supply to Electric System | No | Yes | Yes | Yes |
| Engine 2 | Non-Driven State | Non-Driven State | Driven State | Driven State |
| Motor 3 | Non-Driven State | Ready to be Driven | Non-Driven State | Ready to be Driven |
| Clutch 11 | OFF-state | ON-state | OFF-state | ON-state |
| Front Wheels 7 | Non-Driven State | Ready to be Driven | Non-Driven State | Ready to be Driven |
| Rear Wheels 6 | Non-Driven State | Non-Driven State | Ready to be Driven | Ready to be Driven |

Fig.6

MULTI-PURPOSE VEHICLE

CROSS-REFERENCE TO RELATED APPLICATION

This application claims priority to Japanese Patent Application No. 2017-91088 filed May 1, 2017, the disclosure of which is hereby incorporated in its entirety by reference.

BACKGROUND OF THE INVENTION

1. Field of the Invention

The present invention relates to a multi-purpose vehicle that includes a travel unit including a pair of right and left first travel apparatuses and a pair of right and left second travel apparatuses.

2. Description of the Related Art

As a multi-purpose vehicle as described above, for example, the multi-purpose vehicle disclosed in JP 2007-239978 A (or its corresponding application US 2007/0219047 A1) is known. The multi-purpose vehicle includes an engine capable of driving a pair of right and left first travel apparatuses and a pair of right and left second travel apparatuses (front wheels and rear wheels). In this multi-purpose vehicle, the engine is used as the power source for the first travel apparatuses and the second travel apparatuses. Accordingly, the multi-purpose vehicle is problematic in that the environmental load due to exhaust gas from the engine is high, the fuel consumption is high, and the like.

For this reason, there is a demand for a multi-purpose vehicle that can achieve a reduction in the environmental load and a reduction in the fuel consumption. Therefore, a multi-purpose vehicle as under is proposed.

SUMMARY OF THE INVENTION

A multi-purpose vehicle comprising:
a vehicle body;
an engine mounted on the vehicle body;
a motor mounted on the vehicle body;
a battery that provides driving electric power to the motor;
a travel unit including a pair of right and left first travel apparatuses to which power from the engine is transmitted, and a pair of right and left second travel apparatuses that are located in front of or behind the first travel apparatuses and to which power from the motor is transmitted;
a mode change switch that operates a travel mode of the vehicle body; and
a mode control device, the mode switch being configured to switch the travel mode of the vehicle body to one of following modes in response to an operation of the mode change switch:
  a two-wheel engine driving mode in which only the engine is driven among the engine and the motor;
  a two-wheel motor driving mode in which only the motor is driven among the engine and the motor;
  a four-wheel hybrid driving mode in which both of the engine and the motor are driven; and
  an OFF-mode in which none of the engine and the motor is driven.

With this configuration, an engine is used as the power source for the first travel apparatuses, and a motor is used as the power source for the second travel apparatuses. Also, an appropriate travel mode can be selected freely according to the situation by switching the travel mode between the two-wheel engine driving mode, the two-wheel motor driving mode, and the four-wheel hybrid driving mode through operation of the mode change switch.

For example, in the case where the electric power for driving the motor is insufficient, traveling can be performed smoothly by using the two-wheel engine driving mode. Also, in the case where a large travel torque is unnecessary such as traveling on flat ground or the like, by using the two-wheel motor driving mode in which the engine is not driven, it is possible to achieve silent traveling, reduce the environmental load because exhaust gas is not emitted from the engine, and also reduce the fuel consumption. Also, in the case of traveling on an uphill while carrying loads, by using the four-wheel hybrid driving mode, a sufficient travel torque is ensured by the driving power of the engine and the driving power of the motor, and it is therefore possible to achieve traveling that is unlikely to cause a shortage of the travel torque.

That is, by effectively using the two-wheel motor driving mode and the like according to the need, it is possible to achieve a reduction in the environmental load and a reduction in the fuel consumption.

According to a preferred embodiment, in the two-wheel engine driving mode and the four-wheel hybrid driving mode, if the mode change switch is operated, the mode control device switches the travel mode of the vehicle body to the two-wheel motor driving mode.

In the case where a mode change switch is provided in the multi-purpose vehicle, for example, the mode change switch may be configured such that when the mode change switch is operated in the two-wheel engine driving mode, the travel mode is switched to the four-wheel hybrid driving mode, and when the mode change switch is operated in the four-wheel hybrid driving mode, the travel mode is switched to the two-wheel motor driving mode.

However, with such a configuration, the target mode to which the travel mode is to be switched varies according to the travel mode at the time of operation of the mode change switch by the operator. Accordingly, in the case of switching the travel mode to the two-wheel motor driving mode, the operator is required to confirm that the current travel mode is the four-wheel hybrid driving mode before the operator operates the mode change switch.

Here, with the configuration according to the preferred embodiment described above, irrespective of the two-wheel engine driving mode or the four-wheel hybrid driving mode, when the mode change switch is operated, the travel mode is switched to the two-wheel motor driving mode. Accordingly, it is possible to avoid a situation in which, in the case of switching the travel mode to the two-wheel motor driving mode, the operator is required to confirm the current travel mode before the operator operates the mode change switch.

According to a preferred embodiment, the multi-purpose vehicle further comprises:
a speed change apparatus through which the power from the engine is transmitted to the first travel apparatuses;
a shift lever that switches the speed change apparatus between a forward movement state and a backward movement state; and
a motor rotation control device that switches the motor between a forward movement driving state and a backward movement driving state based on an operation of the shift lever in the two-wheel motor driving mode.

With this configuration, irrespective of the two-wheel engine driving mode or the two-wheel motor driving mode, the multi-purpose vehicle can be switched between forward and backward movements through operation of the shift lever. Accordingly, it is possible to achieve a simple operation of switching between forward and backward movements and good operability as compared with a configuration in which the operation member for switching between forward and backward movements in the two-wheel engine driving mode and the operation member for switching between forward and backward movements in the two-wheel motor driving mode are provided as different operation members.

According to a preferred embodiment, the shift lever has a forward movement position and a backward movement position, in the two-wheel engine driving mode and the four-wheel hybrid driving mode, when the shift lever is operated to the forward movement position, the speed change apparatus is switched to the forward movement state, and when the shift lever is operated to the backward movement position, the speed change apparatus is switched to the backward movement state, and in the two-wheel motor driving mode, when the shift lever is operated to the forward movement position, the motor is switched to the forward movement driving state by the motor rotation control device, and when the shift lever is operated to the backward movement position, the motor is switched to the backward movement driving state by the motor rotation control device.

With this configuration, irrespective of whether the travel mode is the two-wheel engine driving mode, the two-wheel motor driving mode, or the four-wheel hybrid driving mode, when the shift lever is moved to the forward movement position, the multi-purpose vehicle moves forward, and when the shift lever is moved to the backward movement position, the multi-purpose vehicle moves backward.

Accordingly, with this configuration, irrespective of whether the travel mode is the two-wheel engine driving mode, the two-wheel motor driving mode, or the four-wheel hybrid driving mode, the multi-purpose vehicle can be switched between forward and backward movements by performing the same operation. Accordingly, it is possible to achieve a simple operation of switching between forward and backward movements and good operability as compared with a configuration in which the operation for switching between forward and backward movements varies depending on the travel mode.

According to a preferred embodiment, the multi-purpose vehicle further comprises: a key switch, wherein the key switch has a first position, a second position and a third position, when the key switch is operated from the first position to the third position, the mode control device switches the travel mode of the vehicle body from the OFF-mode to the two-wheel engine driving mode or the four-wheel hybrid driving mode, and when the key switch is moved from the first position to the second position, the mode control device switches the travel mode of the vehicle body from the OFF-mode to the two-wheel motor driving mode.

With this configuration, when the operator starts traveling of the multi-purpose vehicle by switching the travel mode from the OFF-mode to any other mode, the operator can freely select either to start driving of the engine or to start only driving of the motor without starting driving of the engine, through operation of the key switch.

Accordingly, with this configuration, the driving state of the engine at the start of traveling of the multi-purpose vehicle can be set to a desired driving state intended by the operator.

According to a preferred embodiment, the multi-purpose vehicle further comprises:

a power generator that is driven by the engine and is configured such that the power from the engine is transmitted to the first travel apparatuses and the power generator, and the battery is capable of storing electric power generated by the power generator; and a power generation operation device configured such that when the power generation operation device is operated in the four-wheel hybrid driving mode, a control mode of the motor is switched between a normal mode and a charge mode, and in the charge mode, driving of the motor is suppressed as compared with that in the normal mode.

With this configuration, in the charge mode, the power consumption of the motor is suppressed as compared with that in the normal mode. That is, in the charge mode, the electric power stored in the battery is unlikely to be used, and thus the amount of electric power stored in the battery is likely to increase.

Accordingly, as a result of the operator operating the power generation operation device where necessary, the state of the multi-purpose vehicle can be changed to a state in which the amount of electric power stored in the battery is likely to increase.

According to a preferred embodiment, the multi-purpose vehicle further comprises:

a speed change apparatus through which the power from the engine is transmitted to the first travel apparatuses;

a shift lever that switches the speed change apparatus between a forward movement state and a backward movement state;

a key switch; and a steering wheel;

wherein the mode change switch and the power generation operation device are disposed on one side of the steering wheel in a right/left direction, and the shift lever and the key switch are disposed on the other side of the steering wheel in the right/left direction.

With this configuration, four operation devices including the mode change switch, the power generation operation device, the shift lever, and the key switch are disposed in pairs on the right side and the left side of the steering wheel. Accordingly, the layout of the operation devices on the right and left sides of the steering wheel is likely to be well balanced as compared with a configuration in which three operation devices are disposed on one side of the steering wheel in the right/left direction and one operation device is disposed on the other side, or a configuration in which all of the four operation devices are disposed on one side of the steering wheel in the right/left direction.

Further aspects of the invention and advantages invited therefrom will be apparent upon reading following description with reference to the drawings.

DETAILED DESCRIPTION OF PREFERRED EMBODIMENTS

An embodiment will be described with reference to the drawings hereinafter. In following description, unless explained otherwise, a direction of forward movement at the time of work traveling is defined as "front", and a direction of backward movement is defined as "back" or "rear". Also, a direction that corresponds to the right side with respect to a forward facing orientation in the front-back direction is defined as "right", and a direction that corresponds to the left side is defined as "left".

Overall Configuration and Power Transmission Structure of Multi-Purpose Vehicle

Figure 1:
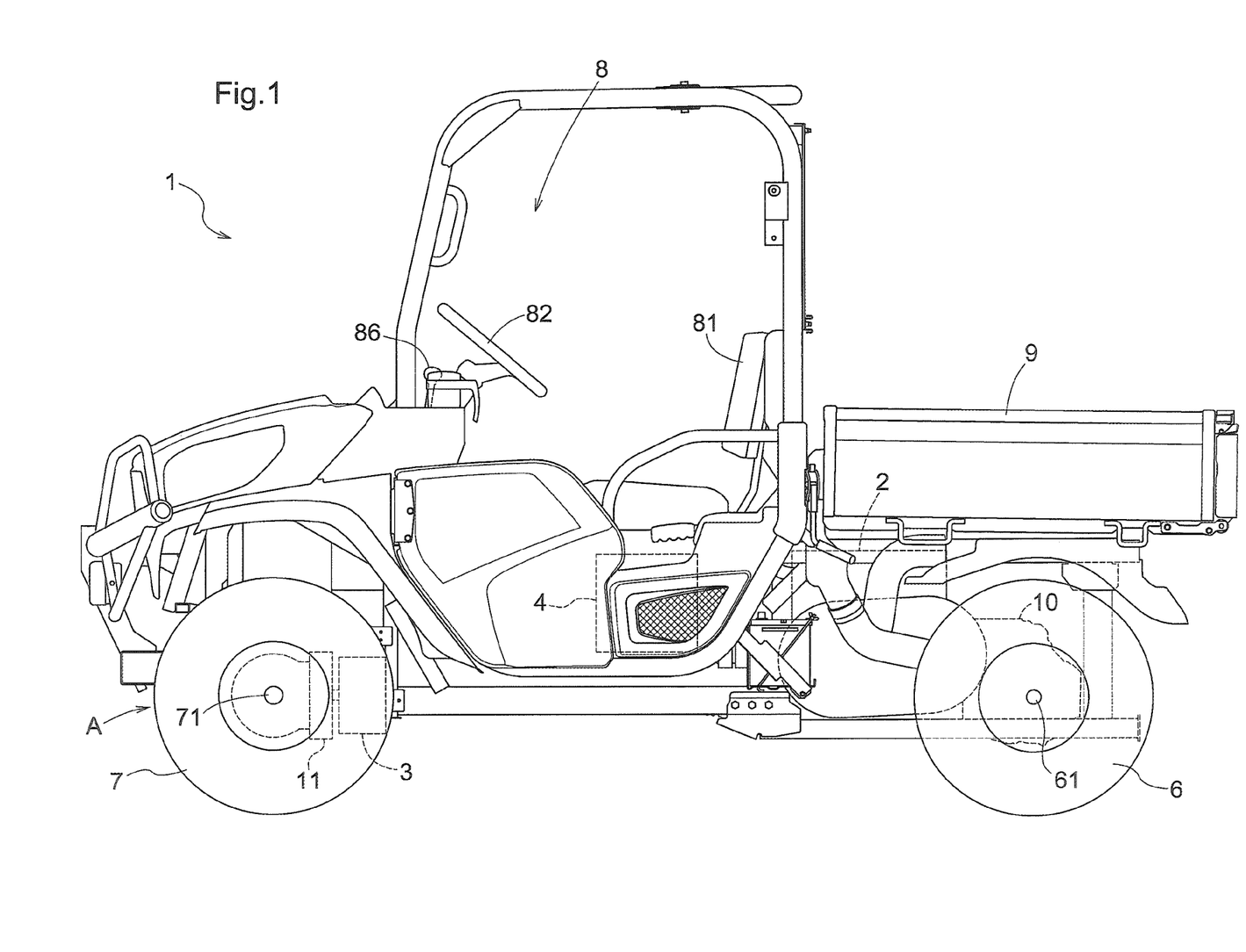
FIG. 1 is a left side view of a multi-purpose vehicle.
Figure 2:
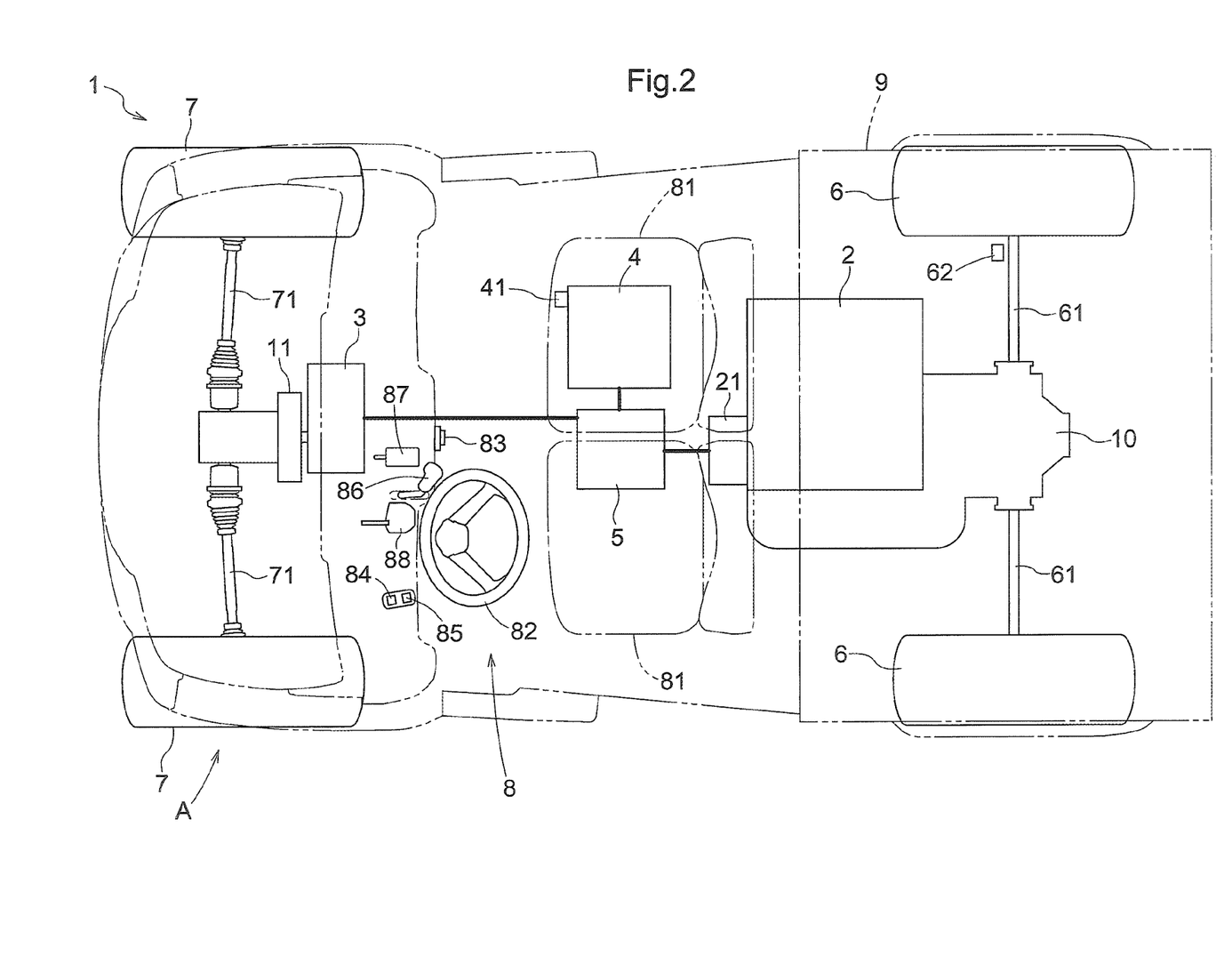
FIG. 2 is a schematic diagram of a power transmission structure of the multi-purpose vehicle in plan view.

As shown in FIGS. 1 and 2, a multi-purpose vehicle 1 includes an engine 2 and a motor 3. Also, in the front-back direction of its vehicle body, a battery 4 and an inverter/converter apparatus 5 are provided between the engine 2 and the motor 3.

The inverter/converter apparatus 5 is capable of converting a direct current from the battery 4 to an alternating current and supplying the alternating current to the motor 3. That is, driving electric power is provided from the battery 4 to the motor 3.

As described above, the multi-purpose vehicle 1 includes the battery 4 that provides driving electric power to the motor 3.

Also, the multi-purpose vehicle 1 includes a travel unit A for the vehicle to travel. The travel unit A includes a pair of right and left rear wheels 6 (corresponding to "first travel apparatuses" according to the present invention) and a pair of right and left front wheels 7 (corresponding to "second travel apparatuses" according to the present invention). The pair of right and left rear wheels 6 are located behind the pair of right and left front wheels 7.

As described above, the multi-purpose vehicle 1 includes the travel unit A that includes the pair of right and left rear wheels 6 and the pair of right and left front wheels 7. Also, the rear wheels 6 are located behind the front wheels 7.

Also, as shown in FIG. 1, the multi-purpose vehicle 1 includes a driving area 8 for the operator to seat, and a loading bed 9 on which loads can be placed. Also, as shown in FIG. 2, the multi-purpose vehicle 1 includes a speed change apparatus 10. The speed change apparatus 10 is configured so as to be capable of changing the driving power of the engine 2, and transmitting the driving power to the rear wheels 6 via a rear axle 61.

As shown in FIG. 2, the engine 2 is configured so as to be capable of driving the rear wheels 6 via the speed change apparatus 10 and the rear axle 61. The motor 3 is configured so as to be capable of driving the front wheels 7 via a clutch 11 that can be switched between an ON-state and an OFF-state and a front axle 71. That is, the power source (the motor 3) for the front wheels 7 and the power source (the engine 2) for the rear wheels 6 are provided separately.

As described above, the multi-purpose vehicle 1 is configured such that engine power, which is the power from the engine 2, is transmitted to the rear wheels 6, and motor power, which is the power from the motor 3, is transmitted to the front wheels 7. Also, the multi-purpose vehicle 1 is configured such that the engine power is transmitted to the rear wheels 6 via the speed change apparatus 10.

Various Types of Operation Devices of Multi-Purpose Vehicle

As shown in FIG. 1, the driving area 8 is located at a central portion in the front-back direction of the vehicle body, and is disposed in front of the loading bed 9. As shown in FIGS. 1 and 2, the driving area 8 includes a seat 81 for the operator to sit on. Also, as shown in FIG. 3, in the driving area 8, a steering wheel 82, a key switch 83, a mode switch button 84 (corresponding to "mode change switch" according to the present invention), a charge mode button 85 (corresponding to "power generation operation device" according to the present invention), and a shift lever 86 are provided.

As described above, the multi-purpose vehicle 1 includes the charge mode button 85.

Figure 3:
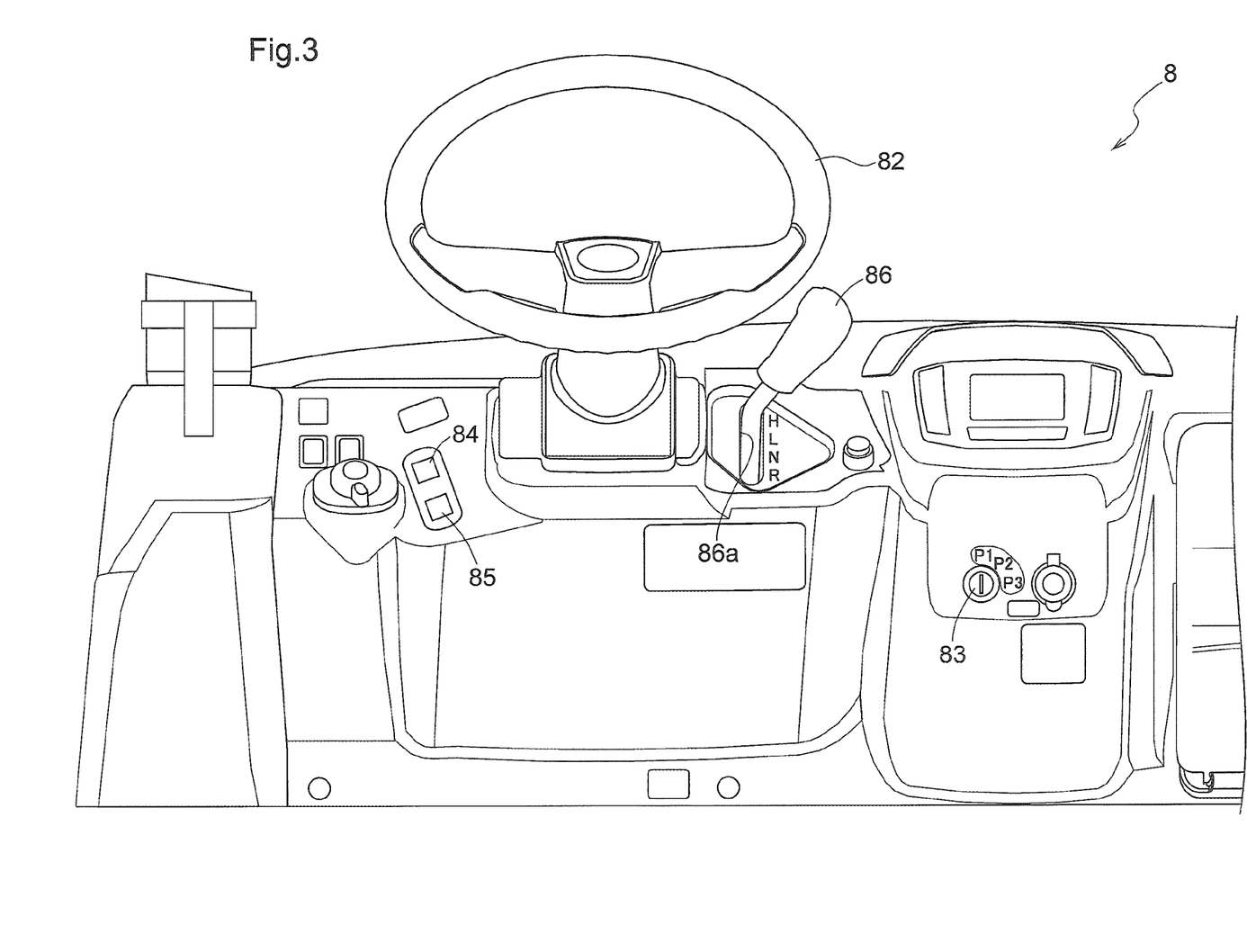
FIG. 3 is a rear view showing a layout of various types of operation devices in the vicinity of a steering wheel.

As shown in FIG. 3, the mode switch button 84 and the charge mode button 85 are disposed on the left side of the steering wheel 82. The shift lever 86 and the key switch 83 are disposed on the right side of the steering wheel 82.

As described above, the mode switch button 84 and the charge mode button 85 are disposed on one side of the steering wheel 82 in the right/left direction, and the shift lever 86 and the key switch 83 are disposed on the other side of the steering wheel 82 in the right/left direction.

Also, as shown in FIG. 2, in the driving area 8, an accelerator pedal 87 and a brake pedal 88 that are operated by being pressed by the operator's foot are provided.

The steering wheel 82 is configured so as to be capable of receiving input of a steering operation of the front wheels 7 in the travel unit A. That is, the steering angle of the travel unit A is changed through operation of the steering wheel 82. As shown in FIG. 2, the steering wheel 82 is disposed at a far left position from the center of the vehicle body in the right/left direction.

As described above, the multi-purpose vehicle 1 includes the steering wheel 82 that is operated to change the steering angle of the travel unit A.

Figure 4:
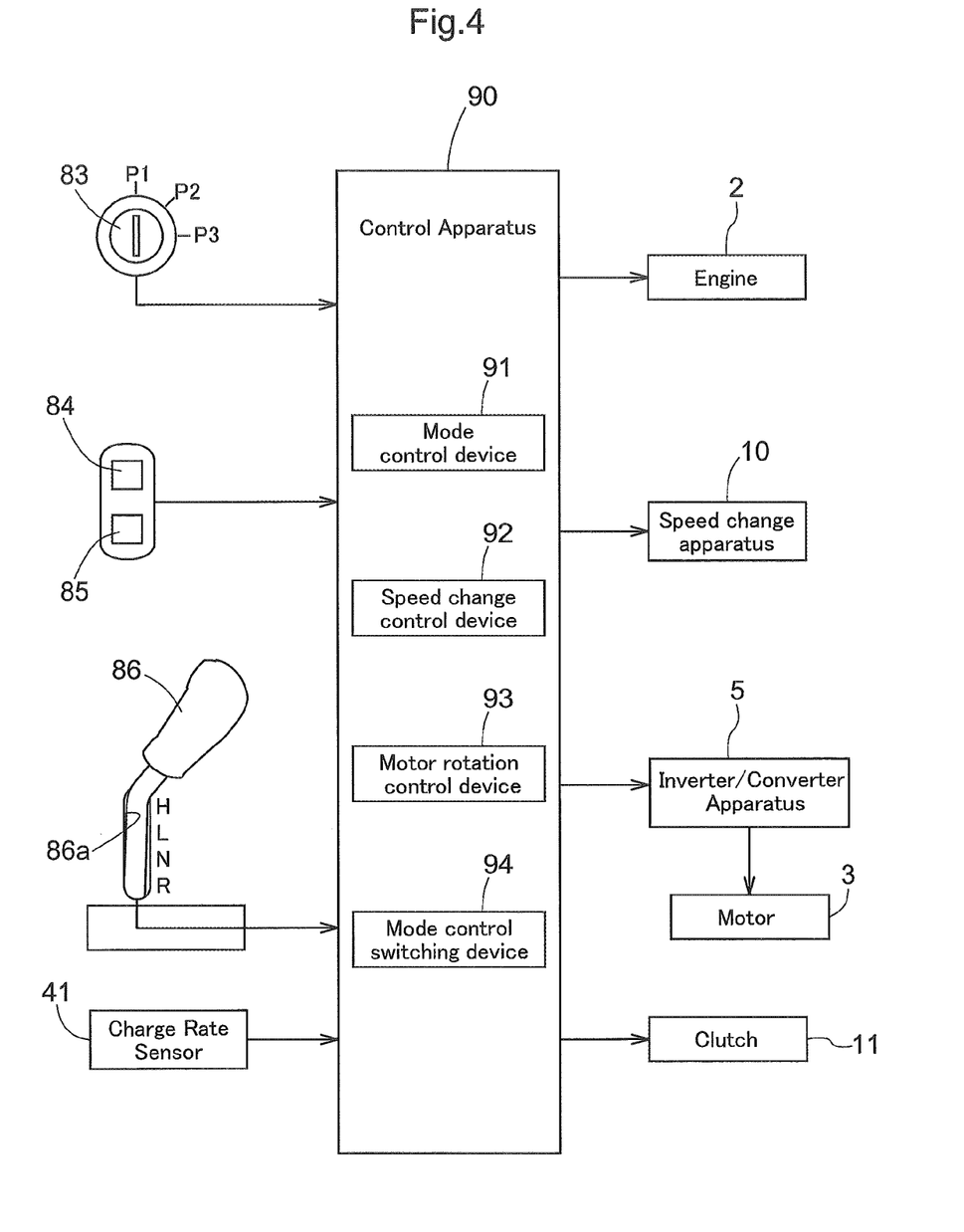
FIG. 4 is a block diagram showing a control configuration.

Also, the key switch 83 is configured so as to be capable of inputting operations of starting and stopping the engine 2. As shown in FIGS. 3 and 4, the key switch 83 is configured so as to be capable of being moved between an OFF-position P1 (corresponding to "first position" according to the present invention), an ON-position P2 (corresponding to "second position" according to the present invention) and a start position P3 (corresponding to "third position" according to the present invention).

When the key switch 83 is operated to the OFF-position P1, the engine 2 is stopped. When the key switch 83 is operated from the OFF-position P1 to the ON-position P2, electric power is supplied to an electric system, and the motor 3 is ready to be driven while the engine 2 is stopped. When the key switch 83 is operated from the ON-position P2 to the start position P3, the engine 2 is started. The key switch 83 is biased to automatically return to the ON-position P2 when the operator removes his/her hand from the key switch 83 at the start position P3.

As shown in FIGS. 3 and 4, the ON-position P2 is set between the OFF-position P1 and the start position P3. That is, when the key switch 83 is moved from the OFF-position P1 to the start position P3, the key switch 83 needs to pass through the ON-position P2.

As described above, the multi-purpose vehicle 1 includes the key switch 83 that is provided so as to be capable of being moved between the OFF-position P1, the ON-position P2 and the start position P3.

The shift lever 86 is configured so as to be capable of switching the state of the speed change apparatus 10. As shown in FIGS. 3 and 4, the shift lever 86 is configured so as to be capable of being shifted along a lever guide groove 86a. The shift lever 86 can be shifted to a backward movement position R, a neutral position N, a low-speed forward movement position L (corresponding to "forward movement position" according to the present invention) and a high-speed forward movement position H (corresponding to "forward movement position" according to the present invention).

Also, the accelerator pedal 87 is configured to be operated by being pressed by the operator's foot. The accelerator pedal 87 is biased to return to the initial position when the operator removes his/her foot from the accelerator pedal 87.

Also, the brake pedal 88 is configured to be operated by being pressed by the operator's foot. The brake pedal 88 is biased to return to the initial position when the operator removes his/her foot from the brake pedal 88. As a result of an operation of pressing the brake pedal 88, a brake mechanism (not shown) is operated, and a braking force thereby acts on the front wheels 7 and the rear wheels 6.

As shown in FIG. 2, the multi-purpose vehicle 1 includes a power generator 21 capable of generating an alternating current in response to driving of the engine 2. That is, the engine power is transmitted not only to the rear wheels 6, but also to the power generator 21.

As described above, the multi-purpose vehicle 1 is configured such that the engine power is transmitted to the rear wheels 6 and the power generator 21.

Also, the multi-purpose vehicle 1 includes a charge rate sensor 41 that detects the charge rate of the battery 4, and a vehicle speed sensor 62 that detects the rotational speed of the rear wheels 6.

Also, the inverter/converter apparatus 5 has a function of converting the alternating current generated in response to the driving of the power generator 21 and the alternating current generated in response to the driving of the motor 3 to a direct current, and charging the battery 4 with the direct current. That is, the battery 4 is capable of storing electric power generated by the power generator 21

As described above, the multi-purpose vehicle 1 includes the power generator 21 that is driven by the engine 2.

Configuration of Control Apparatus

As shown in FIG. 4, the multi-purpose vehicle 1 includes a control apparatus 90. The control apparatus 90 includes a mode control device 91, a speed change control device 92, a motor rotation control device 93 and a mode control switching device 94.

The control apparatus 90 receives input of various types of signals from the key switch 83, the mode switch button 84, the charge mode button 85, the shift lever 86 and the charge rate sensor 41. Then, the control apparatus 90 outputs predetermined signals to the engine 2, the speed change apparatus 10, the inverter/converter apparatus 5 and the clutch 11, based on the various types of signals that have been input.

Figure 5:
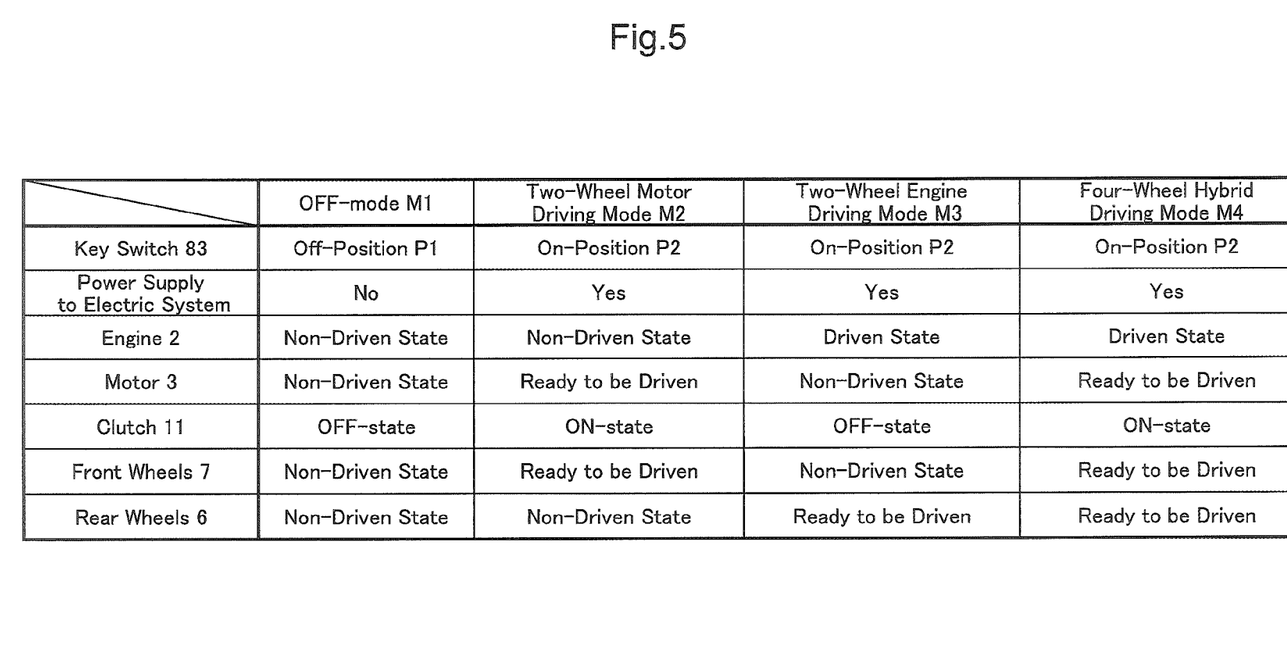
FIG. 5 is a table showing the state of each travel mode.

As shown in FIG. 5, the mode control device 91 is configured so as to be capable of switching the travel mode of the multi-purpose vehicle 1 to any one of the following modes: an OFF-mode M1 in which none of the engine 2 and the motor 3 is driven; a two-wheel motor driving mode M2 in which only the motor 3 (only the front wheels 7) is driven; a two-wheel engine driving mode M3 in which only the engine 2 (only the rear wheels 6) is driven; and a four-wheel hybrid driving mode M4 in which both of the engine 2 and the motor 3 (the rear wheels 6 and the front wheels 7) are driven.

As described above, the multi-purpose vehicle 1 includes the mode control device 91 that switches the travel mode between the two-wheel engine driving mode M3 in which among the engine 2 and the motor 3, only the engine 2 is driven, the two-wheel motor driving mode M2 in which among the engine 2 and the motor 3, only the motor 3 is driven, the four-wheel hybrid driving mode M4 in which both of the engine 2 and the motor 3 are driven, and the OFF-mode M1 in which none of the engine 2 and the motor 3 is driven.

Travel Modes

As shown in FIG. 5, in the OFF-mode M1, the key switch 83 is in the OFF-position P1. In the OFF-mode M1, power is not supplied to the electric system, and the engine 2 and the motor 3 are in a non-driven state. The clutch 11 is switched to an OFF-state. That is, the rear wheels 6 and the front wheels 7 are in a non-driven state.

The two-wheel motor driving mode M2 is a travel mode in which the engine 2 is not driven, and only the motor 3 is driven, or in other words, is an EV (electric vehicle) mode. In the two-wheel motor driving mode M2, the key switch 83 is in the ON-position P2. In the two-wheel motor driving mode M2, power is supplied to the electric system, the engine 2 is in a non-driven state, and the motor 3 is ready to be driven. The clutch 11 is switched to an ON-state. That is, the rear wheels 6 are in a non-driven state, whereas the front wheels 7 are ready to be driven.

The two-wheel engine driving mode M3 is a travel mode in which the motor 3 is not driven, and only the engine 2 is driven. In the two-wheel engine driving mode M3, the key switch 83 is in the ON-position P2. In the two-wheel engine driving mode M3, power is supplied to the electric system, the motor 3 is in a non-driven state, and the engine 2 is driven. The clutch 11 is switched to an OFF-state. That is, the front wheels 7 are in a non-driven state, whereas the rear wheels 6 are ready to be driven.

The four-wheel hybrid driving mode M4 is a travel mode in which both of the engine 2 and the motor 3 are driven. In the four-wheel hybrid driving mode M4, the key switch 83 is in the ON-position P2. In the four-wheel hybrid driving mode M4, power is supplied to the electric system, the engine 2 is driven, and the motor 3 is ready to be driven. The clutch 11 is switched to an ON-state. That is, both of the rear wheels 6 and the front wheels 7 are ready to be driven.

Switching of State in Two-Wheel Engine Travel Mode and Four-Wheel Hybrid Travel Mode In the two-wheel engine driving mode M3 and the four-wheel hybrid driving mode M4, an operation signal of the shift lever 86 is input into the speed change control device 92 (see FIG. 4). Then, the speed change control device 92 outputs a control signal to the speed change apparatus 10 according to the operation signal from the shift lever 86. The state of the speed change apparatus 10 is thereby switched.

To be more specific, when the shift lever 86 is shifted to the neutral position N, the speed change apparatus 10 is set in a neutral state. When the shift lever 86 is shifted to the low-speed forward movement position L, the speed change apparatus 10 is set in a low-speed forward movement state (corresponding to "forward movement state" according to the present invention). When the shift lever 86 is shifted to the high-speed forward movement position H, the speed change apparatus 10 is set in a high-speed forward movement state (corresponding to "forward movement gear state" according to the present invention) in which the gear ratio is smaller than that in the low-speed forward movement state.

When the shift lever 86 is shifted to the backward movement position R, the speed change apparatus 10 is set in a backward movement state.

As described above, the multi-purpose vehicle 1 includes the shift lever 86 that is operated to switch the state of the speed change apparatus 10 between the low-speed forward movement state, the high-speed forward movement state and the backward movement state. Also, the shift lever 86 is provided so as to be capable of being moved between the low-speed forward movement position L, the high-speed forward movement position H and the backward movement position R.

Also, as described above, the multi-purpose vehicle 1 is configured such that, when the shift lever 86 is moved to the low-speed forward movement position L or the high-speed forward movement position H in the two-wheel engine driving mode M3 or the four-wheel hybrid driving mode M4, the state of the speed change apparatus 10 is switched to the low-speed forward movement state or the high-speed forward movement state, and when the shift lever 86 is moved to the backward movement position R, the state of the speed change apparatus 10 is switched to the backward movement state.

Switching of Driving State of Motor in Two-Wheel Motor Travel Mode

In the two-wheel motor driving mode M2, an operation signal of the shift lever 86 is input into the motor rotation control device 93 (see FIG. 4). Then, the motor rotation control device 93 outputs a control signal to the inverter/converter apparatus 5 according to the operation signal from the shift lever 86. The driving state of the motor 3 is thereby switched.

To be more specific, when the shift lever 86 is shifted to the low-speed forward movement position L or the high-speed forward movement position H, the motor 3 is set in a forward movement driving state. When the shift lever 86 is shifted to the backward movement position R, the motor 3 is set in a backward movement driving state.

As described above, the multi-purpose vehicle 1 includes the motor rotation control device 93 that switches the driving state of the motor 3 between the forward movement driving state and the backward movement driving state in response to an operation of the shift lever 86 in the two-wheel motor driving mode M2.

Also, as described above, in the multi-purpose vehicle 1, when the shift lever 86 is moved to the low-speed forward movement position L or the high-speed forward movement position H in the two-wheel motor driving mode M2, the driving state of the motor 3 is switched to the forward movement driving state by the motor rotation control device 93, and when the shift lever 86 is moved to the backward movement position R, the driving state of the motor 3 is switched to the backward movement driving state by the motor rotation control device 93.

Normal Mode and Charge Mode

In the four-wheel hybrid driving mode M4, an operation signal of the charge mode button 85 is input into the mode control switching device 94 (see FIG. 4). Then, the mode control switching device 94 switches the control mode of the motor 3 between a normal mode and a charge mode according to the operation signal from the charge mode button 85.

To be more specific, in the four-wheel hybrid driving mode M4, the control mode of the motor 3 is in the normal mode until the charge mode button 85 is pressed. When the charge mode button 85 is pressed, the control mode of the motor 3 is switched to the charge mode.

As described above, the multi-purpose vehicle 1 is configured such that when the charge mode button 85 is operated in the four-wheel hybrid driving mode M4, the control mode of the motor 3 is switched between the normal mode and the charge mode.

Figure 6:
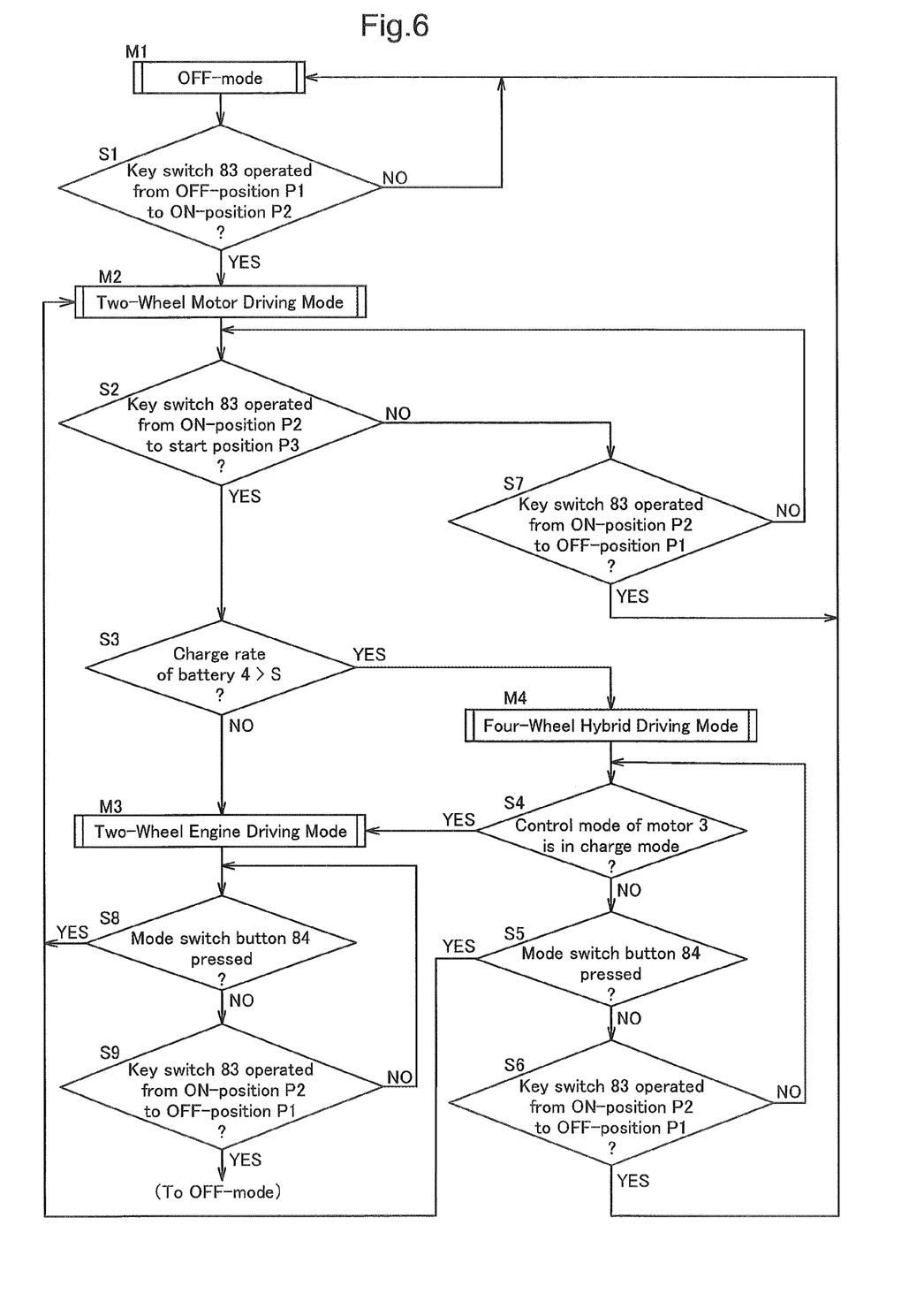
FIG. 6 is a flowchart illustrating a procedure for transition between travel modes.

Hereinafter, a procedure for transition between travel modes performed in the multi-purpose vehicle 1 will be described with reference to FIG. 6. First, a case C1 will be described in which the key switch 83 is moved from the OFF-position P1 to the start position P3 in a state in which the travel mode is in the OFF-mode M1, and the charge rate of the battery 4 is higher than a predetermined charge rate S, and thereafter the key switch 83 is moved from the ON-position P2 to the OFF-position P1, without the mode switch button 84 and the charge mode button 85 being pressed.

Case C1

In the OFF-mode M1, a determination is made in step S1. In step S1, it is determined whether or not the key switch 83 has been moved from the OFF-position P1 to the ON-position P2.

If NO is determined in step S1, the procedure returns to step S1. That is, the processing in step S1 is repeated until the key switch 83 is moved from the OFF-position P1 to the ON-position P2.

As described above, when the key switch 83 is moved from the OFF-position P1 to the start position P3, the key switch 83 needs to pass through the ON-position P2. In the case C1, the key switch 83 is moved from the OFF-position P1 to the start position P3. That is, the key switch passes through the ON-position P2 (YES), and thus the travel mode is switched from the OFF-mode M1 to the two-wheel motor driving mode M2 by the mode control device 91. After that, the procedure transitions to step S2.

In step S2, it is determined whether or not the key switch 83 has been moved from the ON-position P2 to the start position P3. In the case C1, the key switch 83 is moved from the OFF-position P1 to the start position P3 via the ON-position P2. That is, the key switch 83 is moved from the ON-position P2 to the start position P3 (YES), and thus the procedure transitions to step S3.

In step S3, it is determined whether or not the charge rate of the battery 4 detected by the charge rate sensor 41 is higher than a predetermined charge rate S. In the case C1, the charge rate of the battery 4 is higher than the predetermined charge rate S (YES), and thus the travel mode is switched from the two-wheel motor driving mode M2 to the four-wheel hybrid driving mode M4 by the mode control device 91. After that, the procedure transitions to step S4.

In step S4, it is determined whether or not the control mode of the motor 3 is in the charge mode. In the case C1, the charge mode button 85 is not pressed. That is, the control mode of the motor 3 is in the normal mode (NO), and thus the procedure transitions to step S5.

In step S5, it is determined whether or not the mode switch button 84 has been pressed. In the case C1, the mode switch button 84 is not pressed (NO), and thus the procedure transitions to step S6.

In step S6, it is determined whether or not the key switch 83 has been moved from the ON-position P2 to the OFF-position P1. If NO is determined in step S6, the procedure returns to step S4. That is, in the case C1, the processing in steps S4, S5 and S6 is repeated during the period between when the travel mode has been switched from the two-wheel motor driving mode M2 to the four-wheel hybrid driving mode M4 and when the key switch 83 is moved from the ON-position P2 to the OFF-position P1.

Then, if the key switch 83 is moved from the ON-position P2 to the OFF-position P1 (YES), the travel mode is switched from the four-wheel hybrid driving mode M4 to the OFF-mode M1 by the mode control device 91.

As described above, if the key switch 83 is moved from the OFF-position P1 to the start position P3 in a state in which the travel mode is in the OFF-mode M1, and the charge rate of the battery 4 is higher than a predetermined charge rate S, the travel mode is switched from the OFF-mode M1 to the four-wheel hybrid driving mode M4 via the two-wheel motor driving mode M2 by the mode control device 91.

Case C2

Next, a case C2 will be described in which the key switch 83 is moved from the OFF-position P1 to the start position P3 in a state in which the travel mode is in the OFF-mode M1, and the charge rate of the battery 4 is higher than a predetermined charge rate S, and thereafter the mode switch button 84 is pressed, without the charge mode button 85 being pressed, and then the key switch 83 is moved from the ON-position P2 to the OFF-position P1.

In the flow of processing in the case C2, the processing from step S1 to step S4 is the same as that of the case C1. Accordingly, the processing performed after the procedure has transitioned from step S4 to step S5 will be described.

In step S5, it is determined whether or not the mode switch button 84 has been pressed. In the case C2, the mode switch button 84 is pressed (YES), and thus the travel mode is switched from the four-wheel hybrid driving mode M4 to the two-wheel motor driving mode M2 by the mode control device 91. After that, the procedure transitions to step S2.

As described above, the multi-purpose vehicle 1 includes the mode switch button 84 that is operated to switch the travel mode.

In step S2, it is determined whether or not the key switch 83 has been moved from the ON-position P2 to the start position P3. In the case C2, the key switch 83 is moved from the ON-position P2 to the OFF-position P1 after the mode switch button 84 has been pressed. That is, at this point in time, the key switch 83 is not moved from the ON-position P2 to the start position P3 (NO), and thus the procedure transitions to step S7.

In step S7, it is determined whether or not the key switch 83 has been moved from the ON-position P2 to the OFF-position P1. If NO is determined in step S7, the procedure returns to step S2. That is, in the case C2, the processing in steps S2 and S7 is repeated during the period between when the travel mode has been switched from the four-wheel hybrid driving mode M4 to the two-wheel motor driving mode M2 and when the key switch 83 is moved from the ON-position P2 to the OFF-position P1.

Then, if the key switch 83 is moved from the ON-position P2 to the OFF-position P1 (YES), the travel mode is switched from the two-wheel motor driving mode M2 to the OFF-mode M1 by the mode control device 91.

Case C3

Next, a case C3 will be described in which the key switch 83 is moved from the OFF-position P1 to the start position P3 in a state in which the travel mode is in the OFF-mode M1, and the charge rate of the battery 4 is higher than a predetermined charge rate S, thereafter the charge mode button 85 is pressed without the mode switch button 84 being pressed, and then the key switch 83 is moved from the ON-position P2 to the OFF-position P1 without the mode switch button 84 being pressed.

In the flow of processing in the case C3, the processing from step S1 to step S3 is the same as that of the case C1. Accordingly, the processing performed after YES has been determined in step S3 will be described.

If YES is determined in step S3, the travel mode is switched from the two-wheel motor driving mode M2 to the four-wheel hybrid driving mode M4 by the mode control device 91. After that, the procedure transitions to step S4.

In the case C3, the processing in steps S4, S5 and S6 is repeated during the period between when the travel mode has been switched from the two-wheel motor driving mode M2 to the four-wheel hybrid driving mode M4 and when the charge mode button 85 is pressed.

Then, if the charge mode button 85 is pressed, the control mode of the motor 3 is switched from the normal mode to the charge mode by the mode control switching device 94. Accordingly, YES is determined in step S4, and the travel mode is switched from the four-wheel hybrid driving mode M4 to the two-wheel engine driving mode M3 by the mode control device 91. After that, the procedure transitions to step S8.

As described above, the traveling in the four-wheel hybrid driving mode M4 is continued while the control mode of the motor 3 is in the normal mode. Then, if the control mode of the motor 3 is switched from the normal mode to the charge mode, the travel mode is switched from the four-wheel hybrid driving mode M4 to the two-wheel engine driving mode M3. In response thereto, the motor 3 stops driving.

That is, with this configuration, in the charge mode, the driving of the motor 3 is suppressed as compared with that in the normal mode.

In step S8, it is determined whether or not the mode switch button 84 has been pressed. In the case C3, the mode switch button 84 is not pressed (NO), and thus the procedure transitions to step S9.

In step S9, it is determined whether or not the key switch 83 has been moved from the ON-position P2 to the OFF-position P1. If NO is determined in step S9, the procedure returns to step S8. That is, in the case C3, the processing in steps S8 and S9 is repeated during the period between when the travel mode has been switched from the four-wheel hybrid driving mode M4 to the two-wheel engine driving mode M3 and when the key switch 83 is moved from the ON-position P2 to the OFF-position P1.

Then, if the key switch 83 is moved from the ON-position P2 to the OFF-position P1 (YES), the travel mode is switched from the two-wheel engine driving mode M3 to the OFF-mode M1 by the mode control device 91.

Case C4

Next, a case C4 will be described in which the key switch 83 is moved from the OFF-position P1 to the start position P3 in a state in which the travel mode is in the OFF-mode M1, and the charge rate of the battery 4 is higher than a predetermined charge rate S, thereafter the charge mode button 85 is pressed without the mode switch button 84 being pressed, then the mode switch button 84 is pressed, and thereafter the key switch 83 is moved from the ON-position P2 to the OFF-position P1.

In the flow of processing in the case C4, the processing from step S1 to step S4 is the same as that of the case C3. Accordingly, the processing performed after YES has been determined in step S4 will be described.

If YES is determined in step S4, the travel mode is switched from the four-wheel hybrid driving mode M4 to the two-wheel engine driving mode M3 by the mode control device 91. After that, the procedure transitions to step S8.

In step S8, it is determined whether or not the mode switch button 84 has been pressed. In the case C4, the mode switch button 84 is pressed (YES) after the charge mode button 85 has been pressed, and thus the travel mode is switched from the two-wheel engine driving mode M3 to the two-wheel motor driving mode M2 by the mode control device 91. After that, the procedure transitions to step S2.

The flow of processing after step S2 is the same as that of the case C2.

As described above, the multi-purpose vehicle 1 is configured such that when the mode switch button 84 is operated in the two-wheel engine driving mode M3 or the four-wheel hybrid driving mode M4, the travel mode is switched to the two-wheel motor driving mode M2.

Case C5

Next, a case C5 will be described in which the key switch 83 is moved from the OFF-position P1 to the start position P3 in a state in which the travel mode is in the OFF-mode M1, and the charge rate of the battery 4 is less than or equal to a predetermined charge rate S, and thereafter the key switch 83 is moved from the ON-position P2 to the OFF-position P1, without the mode switch button 84 being pressed.

In the flow of processing in the case C5, the processing from step S1 to step S2 is the same as that of the case C1. Accordingly, the processing performed after YES has been determined in step S2 will be described.

If YES is determined in step S2, the procedure transitions to step S3.

In step S3, it is determined whether or not the charge rate of the battery 4 detected by the charge rate sensor 41 is higher than a predetermined charge rate S. In the case C5, the charge rate of the battery 4 is not higher than the predetermined charge rate S (NO), and thus the travel mode is switched from the two-wheel motor driving mode M2 to the two-wheel engine driving mode M3 by the mode control device 91. After that, the procedure transitions to step S8.

The flow of processing after step S8 is the same as that of the case C3.

Case C6

Next, a case C6 will be described in which the key switch 83 is moved from the OFF-position P1 to the ON-position P2 in a state in which the travel mode is in the OFF-mode M1, and thereafter the key switch 83 is moved from the ON-position P2 to the OFF-position P1, without being moved to the start position P3.

In the OFF-mode M1, a determination is made in step S1. In step S1, it is determined whether or not the key switch 83 has been moved from the OFF-position P1 to the ON-position P2.

If NO is determined in step S1, the procedure returns to step S1. That is, the processing in step S1 is repeated until the key switch 83 is moved from the OFF-position P1 to the ON-position P2.

In the case C6, the key switch 83 is moved from the OFF-position P1 to the ON-position P2 (YES), and thus the travel mode is switched from the OFF-mode M1 to the two-wheel motor driving mode M2 by the mode control device 91. After that, the procedure transitions to step S2.

In step S2, it is determined whether or not the key switch 83 has been moved from the ON-position P2 to the start position P3. In the case C6, the key switch 83 is not moved to the start position P3 (NO), and thus the procedure transitions to step S7.

In step S7, it is determined whether or not the key switch 83 has been moved from the ON-position P2 to the OFF-position P1. If NO is determined in step S7, the procedure returns to step S2. That is, in the case C6, the processing in steps S2 and S7 is repeated during the period between when the travel mode has been switched from the OFF-mode M1 to the two-wheel motor driving mode M2 and when the key switch 83 is moved from the ON-position P2 to the OFF-position P1.

Then, if the key switch 83 is moved from the ON-position P2 to the OFF-position P1 (YES), the travel mode is switched from the two-wheel motor driving mode M2 to the OFF-mode M1 by the mode control device 91.

As described above, when the key switch 83 is moved from the OFF-position P1 to the start position P3, the travel mode is switched from the OFF-mode M1 to the two-wheel engine driving mode M3 or the four-wheel hybrid driving mode M4 by the mode control device 91; and when the key switch 83 is moved from the OFF-position P1 to the ON-position P2, the travel mode is switched from the OFF-mode M1 to the two-wheel motor driving mode M2 by the mode control device 91.

Summary of the Foregoing Embodiment

With the configuration described above, the engine 2 is used as the power source for the rear wheels 6, and the motor 3 is used as the power source for the front wheels 7. Also, an appropriate travel mode can be selected freely according to the situation by switching the travel mode between the two-wheel engine driving mode M3, the two-wheel motor driving mode M2 and the four-wheel hybrid driving mode M4 through operation of the mode switch button 84.

For example, in the case where the electric power for driving the motor 3 is insufficient, traveling can be performed smoothly by using the two-wheel engine driving mode M3. Also, in the case where a large travel torque is unnecessary such as traveling on flat ground or the like, by using the two-wheel motor driving mode M2 in which the engine 2 is not driven, it is possible to achieve silent traveling, reduce the environmental load because exhaust gas is not emitted from the engine 2, and also reduce the fuel consumption. Also, in the case of traveling on an uphill while carrying loads, by using the four-wheel hybrid driving mode M4, a sufficient travel torque is ensured by the driving power of the engine 2 and the driving power of the motor 3, and it is therefore possible to achieve traveling that is unlikely to cause a shortage of the travel torque.

That is, with the configuration described above, by effectively using the two-wheel motor driving mode M2 and the like according to the need, it is possible to achieve a reduction in the environmental load and a reduction in the fuel consumption.

Other Embodiments (1) The travel unit A may include, instead of the pair of right and left rear wheels 6 and the pair of right and left front wheels 7, a pair of right and left rear crawler apparatuses and a pair of right and left front crawler apparatuses.

(2) The motor 3 may be used as the power source for the rear wheels 6, and the engine 2 may be used as the power source for the front wheels 7.

(3) Instead of the mode switch button 84, a mode switching lever may be provided.

(4) Instead of the charge mode button 85, a charge mode lever may be provided.

(5) The positions to which the shift lever 86 can be shifted may be only two positions: the backward movement position; and the forward movement position (6) The mode switch button 84 and the charge mode button 85 may be disposed on the right side of the steering wheel 82, and the shift lever 86 and the key switch 83 may be disposed on the left side of the steering wheel 82.

(7) A configuration may be used in which in the charge mode, the four-wheel hybrid driving mode M4 is continued while limiting the amount of driving of the motor 3, rather than stopping the driving of the motor 3.

(8) The OFF-position P1, the ON-position P2 and the start position P3 of the key switch 83 are not necessarily arranged such that the ON-position P2 is set between the OFF-position P1 and the start position P3. For example, the OFF-position P1 may be set between the ON-position P2 and the start position P3, or the start position P3 may be set between the OFF-position P1 and the ON-position P2.

(9) A configuration may be used in which the travel mode is switched from the OFF-mode M1 directly to the two-wheel engine driving mode M3 or the four-wheel hybrid driving mode M4 without passing through the two-wheel motor driving mode M2.

(10) A configuration may be used in which if the mode switch button 84 is pressed in the two-wheel engine driving mode M3, the travel mode is switched to the two-wheel motor driving mode M2, and if the mode switch button 84 is pressed in the four-wheel hybrid driving mode M4, the travel mode is not switched to the two-wheel motor driving mode M2.

(11) A configuration may be used in which if the mode switch button 84 is pressed in the four-wheel hybrid driving mode M4, the travel mode is switched to the two-wheel motor driving mode M2, and if the mode switch button 84 is pressed in the two-wheel engine driving mode M3, the travel mode is not switched to the two-wheel motor driving mode M2.

(12) A configuration may be used in which the driving state of the motor 3 is switched between the forward movement driving state and the backward movement driving state in response to an operation of a forward/backward movement switching switch that is provided separately, instead of an operation of the shift lever 86.

(13) The positions to which the key switch 83 can be moved may be only two positions: the OFF-position P1; and the ON-position P2.

(14) The power generator 21 may be omitted.

(15) The charge mode button 85 may be omitted.

(16) The embodiment described above is configured such that the target mode to which the travel mode is to be switched is determined by determining whether or not the charge rate of the battery 4 is higher than a predetermined charge rate S in step S3. However, the present invention is not limited thereto. That is, the target mode to which the travel mode is to be switched may be determined based on any other determination.

With regard to the other configurations as well, the embodiments disclosed herein are in all respects as illustrative, and embodiments of the present invention are not limited thereto. That is, appropriate changes and modifications may be made to the configurations that are not as set forth in the claims in the present application without departing from the objects of the present invention.

What is claimed is:

1. A multi-purpose vehicle comprising:
   a vehicle body;
   an engine mounted on the vehicle body;
   a motor mounted on the vehicle body;
   a battery that provides driving electric power to the motor;
   a travel unit including a pair of right and left first travel apparatuses to which power from the engine is transmitted, and a pair of right and left second travel apparatuses that are located in front of or behind the first travel apparatuses and to which power from the motor is transmitted;
   a mode change switch that operates a travel mode of the vehicle body; and
   a mode control device, the mode switch being configured to switch the travel mode of the vehicle body to one of following modes in response to an operation of the mode change switch:
     a two-wheel engine driving mode in which only the engine is driven among the engine and the motor;
     a two-wheel motor driving mode in which only the motor is driven among the engine and the motor;
     a four-wheel hybrid driving mode in which both of the engine and the motor are driven; and
     an OFF-mode in which none of the engine and the motor is driven;
   a speed change apparatus through which the power from the engine is transmitted to the first travel apparatuses;
   a shift lever that switches the speed change apparatus between a forward movement state and a backward movement state;
   a key switch; and
   a steering wheel;
   wherein the mode change switch is disposed on one side of the steering wheel in a right/left direction, and the shift lever and the key switch are disposed on the other side of the steering wheel in the right/left direction.

2. The multi-purpose vehicle according to claim 1, wherein
   in the two-wheel engine driving mode and the four-wheel hybrid driving mode, if the mode change switch is operated, the mode control device switches the travel mode of the vehicle body to the two-wheel motor driving mode.

3. The multi-purpose vehicle according to claim 1, further comprising:
   a motor rotation control device that switches the motor between a forward movement driving state and a backward movement driving state based on an operation of the shift lever in the two-wheel motor driving mode.

4. The multi-purpose vehicle according to claim 3, wherein
   the shift lever has a forward movement position and a backward movement position,
   in the two-wheel engine driving mode and the four-wheel hybrid driving mode,
   when the shift lever is operated to the forward movement position, the speed change apparatus is switched to the forward movement state, and
   when the shift lever is operated to the backward movement position, the speed change apparatus is switched to the backward movement state, and
   in the two-wheel motor driving mode,
   when the shift lever is operated to the forward movement position, the motor is switched to the forward movement driving state by the motor rotation control device, and
   when the shift lever is operated to the backward movement position, the motor is switched to the backward movement driving state by the motor rotation control device.

5. The multi-purpose vehicle according to claim 1, further comprising:
   a key switch,
   wherein the key switch has a first position, a second position and a third position,
   when the key switch is operated from the first position to the third position, the mode control device switches the travel mode of the vehicle body from the OFF-mode to the two-wheel engine driving mode or the four-wheel hybrid driving mode, and when the key switch is moved from the first position to the second position, the mode control device switches the travel mode of the vehicle body from the OFF-mode to the two-wheel motor driving mode.

6. The multi-purpose vehicle according to claim 1, further comprising:
a power generator that is driven by the engine and is configured such that the power from the engine is transmitted to the first travel apparatuses and the power generator, and the battery is capable of storing electric power generated by the power generator; and
a power generation operation device configured such that when the power generation operation device is operated in the four-wheel hybrid driving mode, a control mode of the motor is switched between a normal mode and a charge mode, and in the charge mode, driving of the motor is suppressed as compared with that in the normal mode.

7. A multi-purpose vehicle comprising:
a vehicle body;
an engine mounted on the vehicle body;
a motor mounted on the vehicle body;
a battery that provides driving electric power to the motor;
a travel unit including a pair of right and left first travel apparatuses to which power from the engine is transmitted, and a pair of right and left second travel apparatuses that are located in front of or behind the first travel apparatuses and to which power from the motor is transmitted;
a mode change switch that operates a travel mode of the vehicle body;
a mode control device, the mode change switch being configured to switch the travel mode of the vehicle body to one of following modes in response to an operation of the mode change switch:
a two-wheel engine driving mode in which only the engine is driven among the engine and the motor;
a two-wheel motor driving mode in which only the motor is driven among the engine and the motor;
a four-wheel hybrid driving mode in which both of the engine and the motor are driven; and
an OFF-mode in which none of the engine and the motor is driven; and
a power generator that is driven by the engine and is configured such that the power from the engine is transmitted to the first travel apparatuses and the power generator, and the battery is capable of storing electric power generated by the power generator;
a power generation operation device configured such that when the power generation operation device is operated in the four-wheel hybrid driving mode, a control mode of the motor is switched between a normal mode and a charge mode;
a speed change apparatus through which the power from the engine is transmitted to the first travel apparatuses;
a shift lever that switches the speed change apparatus between a forward movement state and a backward movement state;
a key switch; and
a steering wheel;
wherein the control mode of the motor includes the normal mode and the charge mode;

wherein, in the four-wheel hybrid driving mode of the vehicle body, when the control mode of the motor is in the charge mode, driving of the motor is suppressed compared with that when the control mode of the motor is in the normal mode, and wherein the mode change switch and the power generation operation device are disposed on one side of the steering wheel in a right/left direction, and the shift lever and the key switch are disposed on the other side of the steering wheel in the right/left direction.

8. The multi-purpose vehicle according to claim 7, wherein
in the two-wheel engine driving mode and the four-wheel hybrid driving mode, if the mode change switch is operated, the mode control device switches the travel mode of the vehicle body to the two-wheel motor driving mode.

9. The multi-purpose vehicle according to claim 7, further comprising:
a speed change apparatus through which the power from the engine is transmitted to the first travel apparatuses;
a shift lever that switches the speed change apparatus between a forward movement state and a backward movement state; and
a motor rotation control device that switches the motor between a forward movement driving state and a backward movement driving state based on an operation of the shift lever in the two-wheel motor driving mode.

10. The multi-purpose vehicle according to claim 9, wherein
the shift lever has a forward movement position and a backward movement position,
in the two-wheel engine driving mode and the four-wheel hybrid driving mode,
when the shift lever is operated to the forward movement position, the speed change apparatus is switched to the forward movement state, and
when the shift lever is operated to the backward movement position, the speed change apparatus is switched to the backward movement state, and
in the two-wheel motor driving mode,
when the shift lever is operated to the forward movement position, the motor is switched to the forward movement driving state by the motor rotation control device, and
when the shift lever is operated to the backward movement position, the motor is switched to the backward movement driving state by the motor rotation control device.

11. The multi-purpose vehicle according to claim 7, further comprising:
a key switch,
wherein the key switch has a first position, a second position and a third position,
when the key switch is operated from the first position to the third position, the mode control device switches the travel mode of the vehicle body from the OFF-mode to the two-wheel engine driving mode or the four-wheel hybrid driving mode, and
when the key switch is moved from the first position to the second position, the mode control device switches the travel mode of the vehicle body from the OFF-mode to the two-wheel motor driving mode.

* * * * *